T. L. RALPH.
ELECTRICAL WATER HEATER.
APPLICATION FILED JAN. 20, 1921.

1,417,409.

Patented May 23, 1922.
2 SHEETS—SHEET 1.

INVENTOR
THOMAS L. RALPH.
BY
G. H. Braddock
ATTORNEY

T. L. RALPH.
ELECTRICAL WATER HEATER.
APPLICATION FILED JAN. 20, 1921.
1,417,409.
Patented May 23, 1922.
2 SHEETS—SHEET 2.
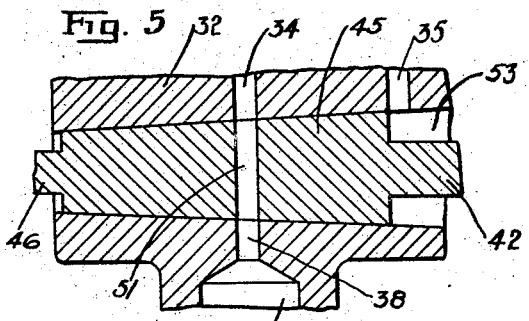
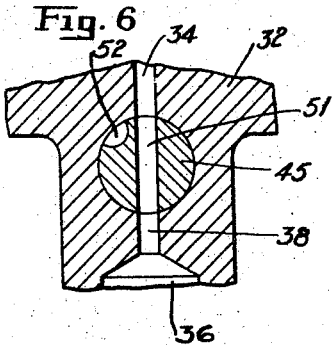
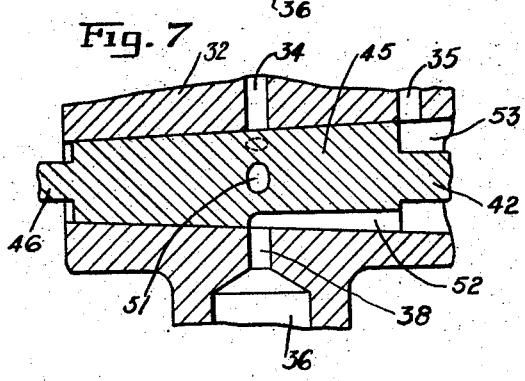
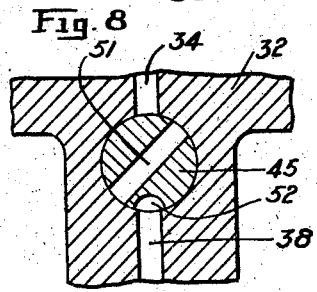
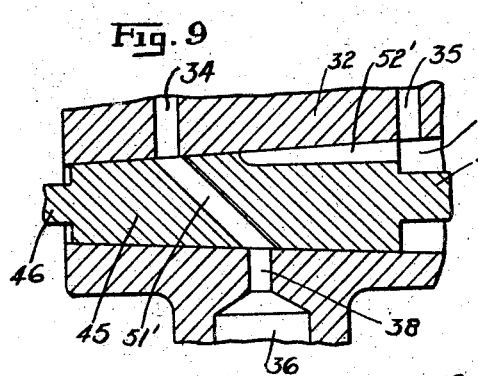
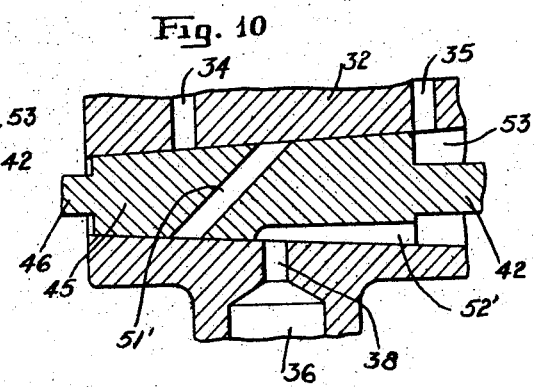
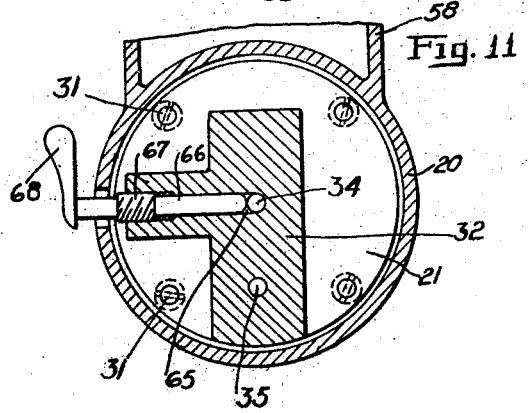
INVENTOR
THOMAS L. RALPH.
BY
G. H. Braddock
ATTORNEY

UNITED STATES PATENT OFFICE.

THOMAS L. RALPH, OF BRIDGEPORT, CONNECTICUT, ASSIGNOR, BY MESNE ASSIGNMENTS, TO HENRY BOBKER, OF NEW YORK, N. Y.

ELECTRICAL WATER HEATER.

1,417,409.  Specification of Letters Patent.  Patented May 23, 1922.

Application filed January 20, 1921. Serial No. 438,599.

*To all whom it may concern:*

Be it known that THOMAS L. RALPH, a citizen of the United States, and resident of Bridgeport, in the county of Fairfield and State of Connecticut, has invented certain new and useful Improvements in Electrical Water Heaters, of which the following is a specification.

This invention relates to electrical water heaters, and an object of the invention is to produce a novel device of the class mentioned equipped with simple and improved valve mechanism adapted to positively control the flow of water through the heater and its element.

A further object is to perfect a device of the present character which is of economic construction and consists of but few parts.

A still further object is to provide the heater with practically constructed means whereby the amount of flow from the faucet can be nicely regulated.

With the above and other objects in view, the invention comprises the construction, arrangement and combination of parts now to be fully described and hereinafter specifically claimed, it being understood that such changes in details of construction and arrangement of parts may be made as fall within the spirit of the invention and within the scope of the claims of this application.

In the accompanying drawing forming a part of this specification,

Fig. 5 is a longitudinal section of the valve body and plug, showing the plug in position to pass hot water to the faucet;

Fig. 6 is a section as on line *y—y* in Fig. 2, with the plug positioned as in Fig. 5;

Fig. 7 is a longitudinal section of the valve body and plug, showing the plug in position to pass cold water to the faucet;

Fig. 8 is a section as on line *y—y* in Fig. 2, with the plug positioned as in Fig. 7;

Fig. 9 is a longitudinal section corresponding with Fig. 5, showing a variant form of plug positioned to pass hot water to the faucet;

Fig. 10 is a view corresponding with Fig. 9, showing the variant form of plug positioned to pass cold water; and Fig. 11 is a transverse section of the casing and valve body disclosing novel means for adjusting the amount of flow to the heating element.

Figure 1:
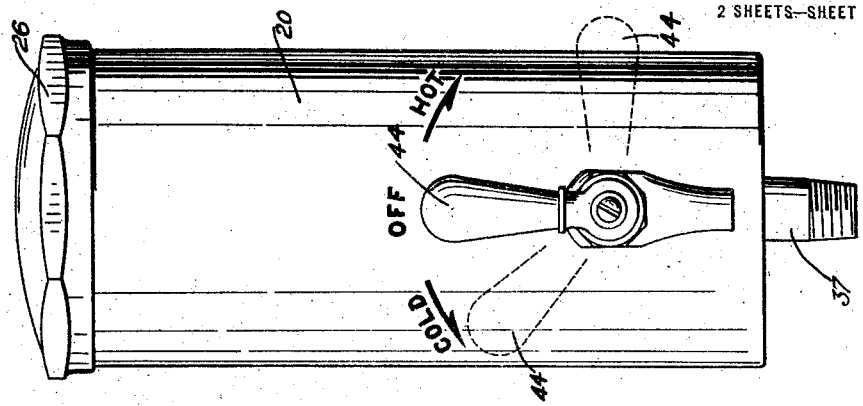
Fig. 1 is a front elevational view of an electrical water heater made in accordance with the principles of the invention.

Numeral 20 denotes a preferably cylindrical casing open at both ends and having intermediate its ends an inwardly extending flange 21. Supported upon flange 21 is a plate 22, preferably of some insulating material, and upon the plate is arranged a heating element 23 of suitable material having longitudinal channels 24 in which are arranged resistance coils 25. Arranged upon the top of element 23 is another similar circular plate 22, and removably threaded upon the upper end of the casing in a manner to enclose the plates and heating element is a cap 26. The longitudinal channels in the heating element provide one continuous water passage through said element as is usual, the element being suitably cut away at its top and bottom, as suggested by numeral 27 in Fig. 2, to allow communication between adjacent channels.

Figure 2:
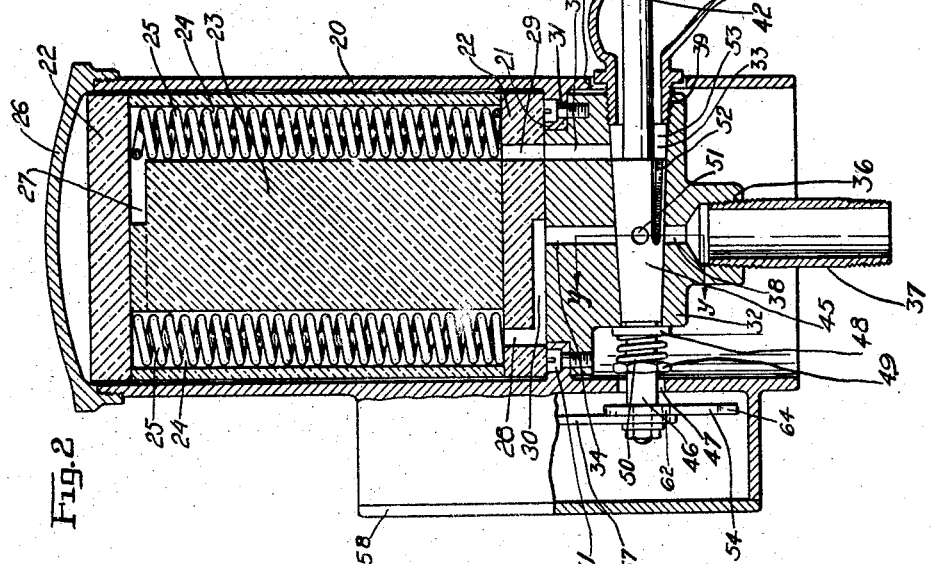
Fig. 2 is a vertical, longitudinal sectional view thereof, showing the shell of the electric switch partially in side elevation and partially broken away.

As disclosed more clearly in Fig. 2, lower plate 22 is provided with an inlet opening 28 to allow water to enter the tortous and continuous passage of the element and with an outlet opening 29 to allow the water to flow from the element. Lower plate 22 is further provided with a horizontally arranged slot 30 extending from about the center of said plate and communicating with opening 28.

Arranged within the casing and secured to the underside of flange 21, as by means of screws 31, is a valve body 32 provided with a tapered bore 33 and having openings denoted by 34 and 35 extending between said bore and slot 30 and opening 29, respectively. The valve body is also provided upon its lower side with a threaded opening 36 adapted to receive a supply pipe 37, and extending between opening 36 and the tapered bore is an opening 38 preferably in alignment with opening 34 and affording communication between the supply pipe and the bore of the valve body.

The large end of the bore of the valve body is threaded to receive the threaded end 39 of a faucet 40 and the casing is cut away as at 41 to allow said threaded end to be inserted in said bore. 42 denotes a spindle mounted in the faucet as at 43 and provided with a manipulating handle 44. The spindle is also provided with a plug portion 45 adapted to snugly seat in the bore of the valve body and with an extension 46 projecting beyond the valve body and passing through a cut away portion 47 of the casing which is arranged diametrically opposite cut away portion 41. 48 denotes a collar free to slide upon extension 46, 49 denotes a nut fixed upon said extension, and 50 denotes a coil spring between said collar and nut for the purpose of firmly holding the collar against the valve body to insure the proper position of the plug, as will be understood.

Referring now more particularly to Figs. 2, 5, 6, 7 and 8, 51 denotes a port extending transversely through the plug and adapted to communicate with openings 34 and 38 leading to the element and from the supply pipe, respectively, 52 denotes a milled port at all times in communication with the faucet and adapted to communicate with opening 38 leading from the supply pipe, and 53 denotes an unfilled part of the tapered bore of the valve body and arranged to communicate with the faucet and with milled port 52.

When the manipulating handle is in the position shown in full lines in Fig. 1, the plug is positioned as it is clearly shown in Fig. 2; that is to say, neither port of the plug is in communication with an opening 34 or 38 of the valve body. There can, consequently be no flow of water from the supply pipe.

When the plug is moved to the position marked "Hot" in Fig. 1, its ports will be positioned as shown in Figs. 5 and 6; that is to say, transverse port 51 will be in communication with openings 34 and 38 leading to the element and from the supply pipe, respectively, and milled port 52 will be covered by the valve body. In consequence, all of the water that flows to the faucet must pass through the element, as is obvious.

When the plug is moved to the position marked "Cold" in Fig. 1, its ports will be positioned as shown in Figs. 7 and 8; that is to say, transverse port 51 will be closed by the valve body and milled port 52 will be in communication with opening 38 leading from the supply pipe. In consequence, all of the water that flows to the faucet passes direct and not through the element.

Figure 4:
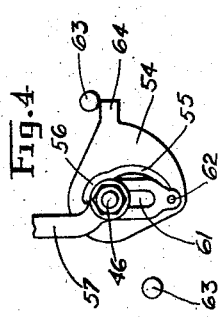
Fig. 4 is a detail corresponding with the showing of Fig. 3, disclosing the elements of the connection between the spindle and the switch mechanism in the positions which they occupy when the switch is in " on " position.
Figure 3:
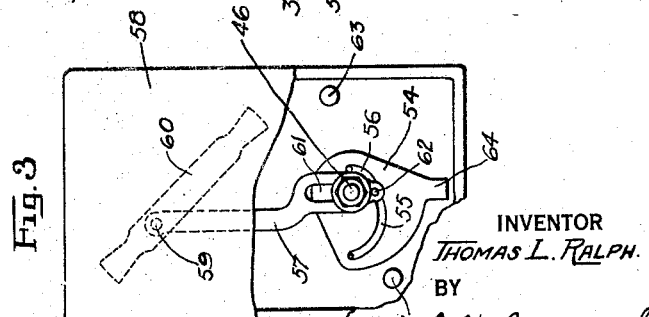
Fig. 3 is a rear elevation of the electric switch with the shell thereof partially broken away to better disclose the connection between the spindle of the heater and the switch mechanism, showing, in dotted lines, the switch arm in " off " position.

Referring now more particularly to Figs. 2, 3 and 4, 54 denotes a cam fixed upon the free end of extension 46 of the spindle and provided with a cam slot 55 and with an arcuate slot 56 which is continuous with the cam slot, and 57 denotes an operating lever for switch mechanism located in the switch shell 58. One end of the operating lever is pivoted at 59 to a switch arm 60 which in turn is pivoted at its midlength in said shell, and the other end of said lever is provided with an elongated slot 61 adapted to ride upon the extension of the spindle and with a pin 62 adapted to ride in cam slot 55 and arcuate slot 56. It is to be remarked that lever 57 need not be pivoted directly upon the switch arm, but may be indirectly connected therewith in any desired way to cause said arm to swing upon its pivot to engage blades carried by said switch shell and having connection with the resistance coils of the element. In Figs. 2 and 3 the spindle and its extension are in "off" position and the switch arm is removed from its blades. As will be apparent, when the manipulating handle is turned to "Cold," there will be no longitudinal movement of the operating lever of the switch mechanism, for the reason that at this time the pin will ride in the arcuate slot of the cam. But when the manipulating handle is turned to "Hot" position, the pin will be forced to ride to the opposite end of the cam slot, as it is shown in Fig. 4, and the operating lever will be given longitudinal movement to cause the switch arm to engage its blades to complete a circuit through the resistance coils of the heating element. It will be apparent that the plug must be positioned to pass water to the element before the switch can be turned "on" and that when the plug is moved so that no water will so pass, the switch must necessarily be "off". The advantage resulting from this is that it is impossible to heat the resistance coils when not surrounded by water.

63 denotes stops carried by the shell of the switch and adapted to be engaged by an extension 64 of the cam to limit the rotating movements of the cam.

65 denotes an opening leading through the valve body and communicating with opening 34 leading to the element, 66 denotes a valve threaded to ride in the valve body as indicated at 67, and 68 denotes an actuating handle extending beyond the casing and adapted to be rotated to cause valve 66 to move longitudinally to regulate the size of opening 34.

With more particular reference to Figs. 9 and 10, the transversely arranged port 51' said figures is obliquely disposed, and the milled port 52' is arranged in longitudinal alignment with one end of port 51', viz, the end adapted to lie adjacent opening 34. When the modified form of plug is positioned as in Fig. 9, water will flow from the supply pipe, through opening 38, through port 51', through opening 34, through the element, through opening 35 and to the faucet. When positioned as shown in Fig. 10, or at an angle of 180° from that of Fig. 9, the flow will be from the supply pipe, through opening 38, through milled port 52' and to the faucet.

What is claimed is:

1. An electric water heater comprising a heating element having a continuous passage and an inlet and an outlet opening, a valve body having a bore and provided with openings extending between said bore and said inlet and outlet openings, respectively, said valve body further having an opening extending between said bore and a water supply pipe, a faucet projecting from said bore, and a ported plug arranged in said bore, whereby said supply pipe opening may be closed, or communication may be had from said supply pipe, through said element and to said faucet, or water may flow to said faucet direct from said supply pipe.

2. An electric water heater comprising a heating element having a continuous passage and an inlet and an outlet opening, a valve body having a tapered bore and provided with openings extending between said bore and said inlet and outlet openings, respectively, said valve body further having an opening extending between said bore and a water supply pipe, a faucet projecting from said bore, a plug seated in said bore and provided with a port adapted to communicate with said supply pipe and element and with a port adapted to allow direct communication between said supply pipe and said faucet, and means whereby both of said ports can be closed or either can be open.

3. An electric water heater comprising a heating element having a continuous passage and an inlet and an outlet opening, a valve body having a tapered bore and provided with openings extending between said bore and said inlet and outlet openings, respectively, said valve body further having an opening extending between said bore and a water supply pipe, a faucet projecting from said bore, a plug seated in said bore, said plug having a transversely arranged port adapted to allow communication between said supply pipe and said element, and a longitudinally arranged port adapted to allow communication directly between said supply pipe and said faucet, and means for rotating said plug.

4. An electric water heater including a heating element having a continuous channel, a plate beneath said element and having inlet and outlet openings communicating with the channel of said element, a valve body beneath said plate and having openings communicating with said inlet and outlet openings, respectively, said valve body further provided with a tapered bore and with an opening adapted to receive water from a supply pipe, all of said openings of said valve body extending to said tapered bore, a faucet projecting from said bore, a plug seated in said bore, said plug having a port adapted to allow communication between said supply pipe and said element and a port adapted to allow water to flow directly from said supply pipe to said faucet, and means whereby both of said ports can be closed or either can be open.

5. In a water heater of the character described, a heating element having a continuous passage, a valve body having a bore, said valve body also having three openings, one of said openings leading from said bore to said element, another leading from said element to said bore, and the third leading from a water supply pipe to said bore, a plug in said bore, said plug having a transversely arranged port adapted to allow communication between said supply pipe opening and said opening leading to said element, and a longitudinally arranged port adapted to allow communication between said supply pipe opening and an unfilled part of said bore, and means for manipulating said plug whereby both of said ports can be closed or either can be open.

6. In a water heater of the character described, a heating element having a continuous passage, a valve body having a tapered bore, said valve body further provided with three openings, one of said openings leading from said bore to said passage, another leading from said passage to said bore, and the third leading from a water supply pipe to said bore, a plug seated in said bore, said plug having a port adapted to allow a flow of water from said supply pipe to said continuous passage and a port adapted to allow a flow from said supply pipe to an unfilled part of said bore, and means for rotating said plug whereby both of said ports can be closed or either can be open.

7. In a water heater of the character described, a heating element having a continuous passage, a valve body having a tapered bore, said valve body further provided with three openings, one of said openings leading from said bore to said passage, another leading from said passage to said bore, and the third leading from a water supply pipe to said bore, a faucet projecting from said bore, a plug seated in said bore, said plug having a port adapted to allow a flow of water from said supply pipe, through said continuous passage and to said faucet and a port adapted to allow a flow from said supply pipe directly to said faucet, and means whereby both of said ports can be closed or either can be open.

8. An electric water heater comprising a cylindrical casing open at both ends and having an inwardly extending flange intermediate its ends, a heating element resting upon said flange and arranged in said casing, a cap upon an end of said casing and enclosing said element, a valve body in said casing and supported from said flange, and means carried by said casing and valve body for operating said water heater.

9. An electrical water heater comprising a cylindrical casing open at both ends and having an inwardly extending flange intermediate its ends, a heating element resting upon said flange and arranged in said casing, a cap removably secured upon an end of said casing to enclose said element, a valve body in said casing and depending from said flange, a faucet supported in said valve body and projecting beyond said casing, and means associated with said valve body and faucet for operating said water heater.

10. In an electrical water heater, a valve body, a plug seated therein, a heating element having a continuous channel in which resistance coils are arranged, said valve body having an opening leading to said channel and an opening leading therefrom, and said plug having ports, and means for connecting said coils in circuit, said means including an extension upon said plug, a cam fixed upon said extension and having a cam slot, switch mechanism, an operating lever therefor having one of its ends slidable upon said extension, a pin carried by said lever and riding in said slot, and means for rotating said extension.

Signed at Bridgeport, in the county of Fairfield, and State of Connecticut, this 18th day of January, A. D., 1921.

THOMAS L. RALPH.